United States Patent
Kanda et al.

(10) Patent No.: US 8,246,789 B2
(45) Date of Patent: Aug. 21, 2012

(54) HYDROUS MATTER TREATMENT SYSTEM

(75) Inventors: Hideki Kanda, Kanagawa (JP); Hisao Makino, Kanagawa (JP); Mayumi Morita, Tokyo (JP); Keizo Takegami, Tokyo (JP); Akio Yoshikoshi, Tokyo (JP); Masazumi Takahashi, Tokyo (JP)

(73) Assignees: Central Research Institute of Electric Power Industry, Tokyo (JP); Tsukishima Kikai Co., Ltd., Tokyo (JP)

( * ) Notice: Subject to any disclaimer, the term of this patent is extended or adjusted under 35 U.S.C. 154(b) by 413 days.

(21) Appl. No.: 12/529,924

(22) PCT Filed: Mar. 6, 2008

(86) PCT No.: PCT/JP2008/054048
§ 371 (c)(1),
(2), (4) Date: Sep. 4, 2009

(87) PCT Pub. No.: WO2008/111483
PCT Pub. Date: Sep. 18, 2008

(65) Prior Publication Data
US 2010/0101928 A1    Apr. 29, 2010

(30) Foreign Application Priority Data
Mar. 9, 2007  (JP) .................... 2007-060703

(51) Int. Cl.
*C02F 11/12* (2006.01)
*B01D 1/28* (2006.01)
*B01D 3/42* (2006.01)

(52) U.S. Cl. ........ 202/160; 159/24.1; 159/44; 159/47.3; 202/182; 202/206; 203/2; 203/14; 203/24; 203/DIG. 8; 210/175; 210/188; 210/742; 210/774

(58) Field of Classification Search .................. 202/160, 202/182, 206; 203/2, 14, 24, 49, DIG. 8; 210/175, 188, 634, 742, 774; 159/24.1, 44, 159/47.3; 568/302, 492; 585/800; 554/16
See application file for complete search history.

(56) References Cited

U.S. PATENT DOCUMENTS

| | | | | | |
|---|---|---|---|---|---|
| 2,152,666 | A | * | 4/1939 | Rosenthal | 554/16 |
| 4,115,208 | A | * | 9/1978 | Verstegen | 203/81 |
| 4,826,662 | A | * | 5/1989 | Mao et al. | 422/610 |
| 4,981,579 | A | * | 1/1991 | Paspek et al. | 208/314 |

(Continued)

FOREIGN PATENT DOCUMENTS

JP    5 507949    11/1993

(Continued)

*Primary Examiner* — Virginia Manoharan
(74) *Attorney, Agent, or Firm* — Oblon, Spivak, McClelland, Maier & Neustadt, L.L.P.

(57) ABSTRACT

A treatment system for a watery material that includes: a dewatering tank in which liquefied matter of a material that is gaseous at a normal temperature and a normal pressure is contacted with the watery material and the watery material is separated into the resultant watery material and a liquid phase that contains an aqueous component from the watery material; an evaporator that vaporizes the material that is gaseous at a normal temperature and a normal pressure from the liquid phase; a separator that separates a gas of the material thus vaporized from effluent water; a condenser that condenses the gas into liquefied matter, two or more external heat sources selected from atmosphere, sewage, warm effluent water, and ground water; an external heat temperature detector that detects temperatures of external heats of the external heat sources; and an external heat supply destination controlling unit.

11 Claims, 5 Drawing Sheets

U.S. PATENT DOCUMENTS

| | | | |
|---|---|---|---|
| 5,294,303 A * | 3/1994 | Robbins | 203/10 |
| 5,346,630 A | 9/1994 | Kenney | |
| 5,573,672 A * | 11/1996 | Rappas et al. | 210/638 |
| 5,906,714 A * | 5/1999 | Gramkow et al. | 203/2 |
| 5,993,608 A * | 11/1999 | Abry et al. | 203/11 |
| 6,117,275 A * | 9/2000 | Baumann | 203/1 |
| 6,120,651 A * | 9/2000 | Gammon et al. | 203/14 |
| 6,800,665 B1 | 10/2004 | Shikada et al. | |
| 2005/0210701 A1 | 9/2005 | Kanda et al. | |

FOREIGN PATENT DOCUMENTS

| | | |
|---|---|---|
| JP | 8 173704 | 7/1996 |
| JP | 9 173845 | 7/1997 |
| JP | 9 173848 | 7/1997 |
| JP | 9 173863 | 7/1997 |
| JP | 9 286754 | 11/1997 |
| JP | 9 309850 | 12/1997 |
| JP | 9 309851 | 12/1997 |
| JP | 9 309852 | 12/1997 |
| JP | 10 182527 | 7/1998 |
| JP | 10 182528 | 7/1998 |
| JP | 10 182529 | 7/1998 |
| JP | 10 182530 | 7/1998 |
| JP | 10 182531 | 7/1998 |
| JP | 10 182532 | 7/1998 |
| JP | 10 182533 | 7/1998 |
| JP | 10 182534 | 7/1998 |
| JP | 10 182535 | 7/1998 |
| JP | 10 195008 | 7/1998 |
| JP | 10 195009 | 7/1998 |
| JP | 10 338653 | 12/1998 |
| JP | 11 130714 | 5/1999 |
| JP | 2000 290673 | 10/2000 |
| JP | 2002 239525 | 8/2002 |
| JP | 2006 130421 | 5/2006 |
| JP | 2006 198575 | 8/2006 |
| WO | 03 101579 | 12/2003 |

* cited by examiner

HYDROUS MATTER TREATMENT SYSTEM

TECHNICAL FIELD

The present invention relates to a treatment system for a watery material.

BACKGROUND ART

There have been known a variety of watery materials. In terms of reuse and quality improvement thereof, a variety of types of means for treating the watery materials is under development.

For example, a sludge generated in a sewage line has generally been incinerated and the incineration ash has been buried for disposal. Incineration thereof requires a preliminary treatment in which a condensation treatment, a dewatering treatment, and drying treatment of considerable amount of fluid contained therein are appropriately combined. Therefore, the incineration thereof is difficult. Whereas a large amount of sewage sludge is discharged, there is a limitation to a ground for disposing the sewage sludge. Therefore, there is a need for technology for reusing the sewage sludge.

An example of dewatering technology is an in-oil modification process (see, for example, Patent Document 1), wherein the prospective water-containing solid is coal. In this process, a water-containing solid slurried in oil is subjected to heat treatment at a temperature of 150° C. or higher, for evaporating the aqueous component in the water-containing solid. By using a liquid oil that is not evaporated at an operating temperature as heating medium, water is selectively evaporated. Therefore, water vapor is not diluted, and a density of evaporative latent heat of water vapor is not reduced. Thus, it is assumed that evaporative latent heat of water vapor can be efficiently recovered in the in-oil modification process. Especially in coal dewatering, it is assumed that the in-oil modification process requires the least energy among all of the know approaches. However, in the in-oil modification process, separation of oil from coal (deoiling) requires centrifugal separation or heating operation at a temperature higher than 150° C. since the oil has a boiling point which is higher than that of water. Thus, the energy consumed at a deoiling step is higher than the energy consumed at dewatering step. Therefore, a full-scale commercial operation of the in-oil modification process has not been practiced yet.

Patent Document 1: Japanese Patent Application Laid-open No. 2000-290673 A

DISCLOSURE OF INVENTION

Problem to be Solved by the Invention

An object of the present invention is to provide means by which energy required for treating watery materials can be saved.

Means for Solving Problem (1) A treatment system for a watery material, the treatment system comprising: a dewatering tank in which liquefied matter of a material that is gaseous at a normal temperature and a normal pressure is contacted with the watery material, and the watery material is separated into a resultant watery material and a liquid phase that contains an aqueous component derived from the watery material; an evaporator that vaporizes the material that is gaseous at a normal temperature and a normal pressure from the liquid phase; a separator that separates a gas of the material thus vaporized from effluent water; a condenser that condenses the gas into liquefied matter; two or more external heat sources selected from the group consisting of atmosphere, sewage, warm effluent water, and ground water; an external heat temperature detector that detects temperatures of external heats of the external heat sources; and an external heat supply destination controlling unit that identifies an external heat source A and an external heat source B that radiates an external heat lower than an external heat from the external heat source A on the basis of the temperatures of the external heats detected by the external heat temperature detector, and controls the external heat from the external heat source A to be supplied to the evaporator and the external heat from the external heat source B to be supplied to the condenser.

(2) The treatment system according to (1), wherein the external heat supply destination controlling unit discontinues supply of the external heats to any one of the evaporator and the condenser or both when there is no temperature difference between the external heats detected by the external heat temperature detector.

(3) The treatment system according to (1) or (2), further comprising: a compressor that compresses the gas of the material that is gaseous at a normal temperature and a normal pressure; and a compressor controlling unit that actuates the compressor when a difference between temperatures of the external heats radiated from the external heat sources A and B that are identified by the external heat supply destination controlling unit is small or when there is no temperature difference between the external heats detected by the external heat temperature detector.

(4) The treatment system according to (3), wherein the compressor controlling unit actuates the compressor when a temperature difference between the external heats radiated from the external heat sources A and B that are identified by the external heat supply destination controlling unit is less than 15° C. or when there is no temperature difference between the external heats detected by the external heat temperature detector.

(5) The treatment system according to any one of (1) to (4), further comprising: a cooler that cools a liquid of the material that is gaseous at a normal temperature and a normal pressure; and a cooler controlling unit that actuates the cooler when a temperature difference between the external heats radiated from the external heat sources A and B that are identified by the external heat supply destination controlling unit is small or when there is no temperature difference between the external heats detected by the external heat temperature detector.

(6) The treatment system according to (5), wherein the cooler controlling unit actuates the cooler when a temperature difference between the external heats radiated from the external heat sources A and B that are identified by the external heat supply destination controlling unit is less than 15° C. or when there is no temperature difference between the external heats detected by the external heat temperature detector.

(7) The treatment system according to (5) or (6), further comprising a heat exchanger that exchanges heat between: a unit or two or more units selected from the group consisting of the external heat source A identified by the external heat supply destination controlling unit, the evaporator, and the separator, and a unit or two or more units selected from the group consisting of the external heat source B identified by the external heat supply destination controlling unit, the condenser, and the cooler.

(8) The treatment system according to (7), wherein the heat exchanger performs heat exchange between: a unit or two or more unit selected from the group consisting of the evaporator and the separator, and a unit or two or more units selected from the group consisting of the condenser and the cooler, the treatment system further comprising a heat exchanger controlling unit that actuates the heat exchanger when a temperature difference between the external heat sources A and B that are identified by the external heat supply destination controlling unit is small or when there is no temperature difference between the external heats detected by the external heat temperature detector.

(9) The treatment system according to (8), wherein the heat exchanger controlling unit actuates the heat exchanger when a temperature difference between the external heats radiated from the external heat sources A and B that are identified by the external heat supply destination controlling unit is less than 15° C. or when there is no temperature difference between the external heats detected by the external heat temperature detector.

(10) The treatment system according to any one of (1) to (9), wherein the dewatering tank, the evaporator, the separator, and the condenser form a circuit and the circuit is so configured that the material that is gaseous at a normal temperature and a normal pressure circulates in the circuit.

(11) The treatment system according to any one of (1) to (10), wherein the material that is gaseous at a normal temperature and a normal pressure is one or a mixture of two or more selected from the group consisting of dimethyl ether, ethyl methyl ether, formaldehyde, ketene, acetaldehyde, butane, and propane.

EFFECT OF THE INVENTION

According to the present invention, in a treatment system for a watery material in which a material that is in gaseous state at a normal temperature and a normal pressure is used, a variety of external heat sources can be effectively used for adjusting a temperature thereof when liquefying or vaporizing the material. Therefore, the energy required for treatment of a sewage sludge and other materials can be saved. The present invention is versatile for a variety of types of the watery materials with a varied amount of the aqueous component. When the present invention is applied to coal dewatering, coal with high quality can be obtained in an efficient manner.

Figure 1:
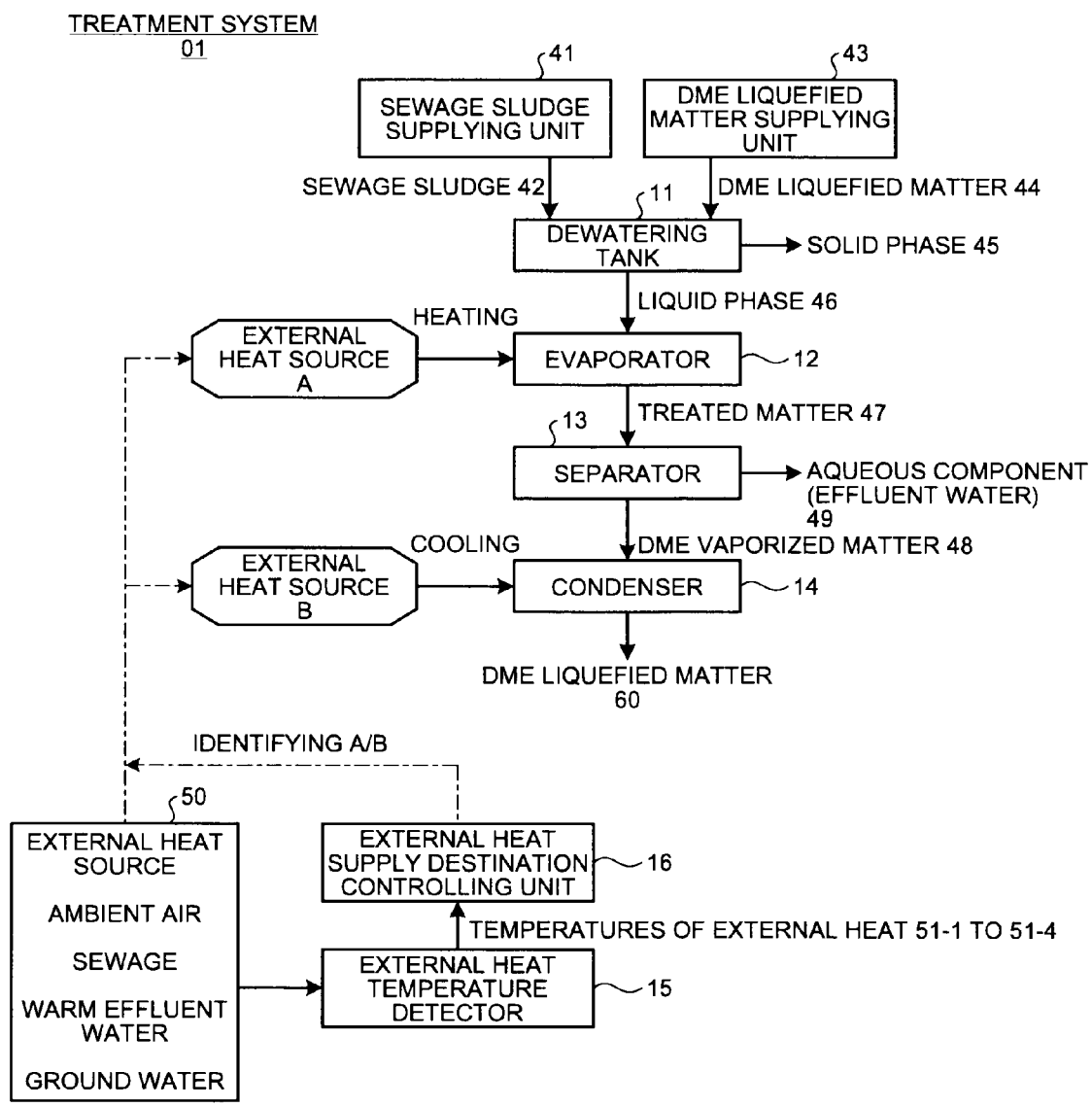
FIG. 1 is a block diagram for conceptually explaining an treatment system 01 that is an example of the treatment system according to the present invention.

EXPLANATIONS OF LETTERS OR NUMERALS 10, 20 treatment facility
11 dewatering tank
12 evaporator
13 separator
14 condenser
15 external heat temperature detector
16 external heat supply destination controlling unit
17A, 17B ambient air supply fan
18 decompression valve
22 sewage passage
23A, 23B switching valve
31 compressor
32 heat exchanger
33 cooler
34A, 34B switching valve
35A, 35B, 35C, 35D switching valve
37 compressor controlling unit
38 heat exchanger controlling unit
39 cooler controlling unit
41 sewage sludge supplying unit
42 sewage sludge
43 DME (dimethyl ether) liquefied matter supplying unit
44, 57, 60 DME liquefied matter
45 solid phase
46 liquid phase
47, 52, 54 treated matter
48, 55 DME vaporized matter
49 aqueous component (effluent water)
50 external heat source
51 temperature of external heat source
56 DME vaporized matter/liquefied matter

BEST MODE FOR CARRYING OUT THE INVENTION

The subject to be treated in the present invention is a watery material. The watery material means a material that contains an aqueous component. "Aqueous component" means water or aqueous solution, regardless of ingredient, origin, or the like thereof. For example, the aqueous component may be water, blood, bodily fluid, or sewage water. "To contain" means that the aqueous component is included in some materials. The size or the ingredient of such a material is not specifically limited. Such a material is, however, preferably in a solid or slurry state as a watery material. There is no limitation either on the manner of the presence of the aqueous component in the watery material. The aqueous component may be a clathrate hydrate therewithin. Alternatively, the aqueous component may be present on an outer surface thereof, between solid particles, or even in a fine pore within a solid particle. The amount of the aqueous component in the watery material is not specifically limited, and is typically 20 to 98 weight percent, and preferably 35 to 85 weight percent. Such a watery material may be a material which has already been dewatered by another dewatering treatment, as long as the watery material still contains the aqueous component.

An example of such a watery material may be a sewage sludge. A "sewage sludge" means a sludge discharged from a sewage treatment plant for treating effluent water such as household effluent water and industrial effluent water, and the sewage sludge may include a dewatered cake. The dewatered cake means a solid material that is obtained by dewatering sewage sludge. The dewatered cake may be obtained from the sewage sludge by performing filtration concentration, solid-liquid separation, or compression using a device equipped with, e.g., a filter, a screw, a centrifugal machine, or a roll. The dewatered cake to be used in the present invention may be obtained by appropriately selecting these methods. Preferable are those obtained by the combination of filtration concentration and compression. Examples of devices for preparing the dewatered cake may include a belt press, a dewatering centrifuge apparatus, and a screw press. The sewage sludge (including the dewatered cake) is prepared so that the content of the aqueous component therein is generally 75 to 85 weight percent (more in particular, about 78 weight percent). Other examples of the watery materials may include coal, polymeric absorbent (such as a used disposable diaper and a used hygiene product), living being (such as weed, flowers, and jelly fish), biomass materials (such as wood chip, leftover meals, kitchen garbage, and other waste matters), and clod. In particular, when the present invention is applied to coal, high quality coal can be obtained in an efficient manner. Coal can be subjected to the present invention, even if the coal is raw coal right after being mined or even if some dewatering treatment has been performed on the coal, (such as an in-oil modification process (see, for example, Japanese Patent Application Laid-open No. 2000-290673 A) and dewatering treatment using a dry inert gas (see Japanese Patent Application Laid-open No. H10-338653 A). The content of the aqueous component in coal is typically 20 to 80 weight percent, and preferably 35 to 67 weight percent. Examples of the species of coal may include subbituminous coal, brown coal, lignite, and peat.

[Overview of a First Embodiment of the Present Invention]

The treatment system according to a first embodiment of the present invention comprises a dewatering tank in which liquefied matter of a material that is gaseous at a normal temperature and a normal pressure is contacted with the watery material and the watery material is separated into a resultant watery material and a liquid phase that contains an aqueous component derived from the watery material, an evaporator that vaporizes the material that is gaseous at a normal temperature and a normal pressure from the liquid phase, a separator that separates a gas of the material thus vaporized from effluent water, a condenser that condenses the gas into liquefied matter, two or more external heat sources selected from the group consisting of atmosphere, sewage, warm effluent water, and ground water, an external heat temperature detector that detects temperatures of external heats of the external heat sources, and an external heat supply destination controlling unit that identifies an external heat source A and an external heat source B that radiates an external heat lower than that of the external heat source A on the basis of the temperatures of the external heats detected by the external heat temperature detector and controls the external heat from the external heat source A to be supplied to the evaporator and the external heat from the external heat source B to be supplied to the condenser.

Examples of the dewatering tank may include a liquid tank that may contain the sewage sludge and the material that is gaseous at a normal temperature and a normal pressure. For the sake of efficient contacting procedure, a plurality of liquid tanks may be connected in series as a circuit, and the liquid tank may be equipped with a stirring device.

The material that is gaseous at a normal temperature and a normal pressure means a material that is in a gaseous state at least under an arbitrary set of conditions of a temperature and a pressure which are within the ranges of a normal temperature and a normal pressure. That is, the material may be a material that is in a gaseous state under conditions of a temperature A and a pressure B which are within the ranges of a normal temperature and a normal pressure, even if the material is not in a gaseous state under conditions within the range of a normal temperature and a normal pressure other than the temperature A and the pressure B.

The normal temperature means a temperature that is close to an ambient temperature, that is, typically −10 to 50° C. and preferably in 0 to 40° C. The normal pressure means a pressure that is close to an ambient pressure, that is, typically within a range around 1 atm.

Specifically, the material that is gaseous at a normal temperature and a normal pressure means a material that is gaseous preferably at a set of conditions of 25° C. and 1 atm., or at a set of conditions of 0° C. and 1 atm., and the most preferably both at the set conditions of 0° C. and 1 atm. and of 25° C. and 1 atm.

The material that is gaseous at a normal temperature and a normal pressure may preferably have a boiling point at around a normal temperature or less so that the material can be dewatered with less energy. In particular, the boiling point is preferably equal to or less than 25° C., more preferably equal to or less than 10° C., and the most preferably equal to or less than −5° C. If the boiling point of the material is higher than a normal temperature, a high temperature energy source is required to vaporize the material and more energy might be required to dewater the material. Therefore, it is not preferable.

Specific examples of the material that is gaseous at a normal temperature and a normal pressure for use in the present invention may include dimethyl ether, ethyl methyl ether, formaldehyde, ketene, acetaldehyde, butane, and propane. Each material may be used alone, or combination of two or more may be used. Preferable among them are dimethyl ether alone or the combination of dimethyl ether and any of other materials described above.

Dimethyl ether has a boiling point of −24.8° C. at 1 atm., and is in a gaseous state at temperatures between −10° C. and 50° C. at an atmospheric pressure. The method and the apparatus for efficiently produce dimethyl ether are disclosed in, for example, Japanese Patent Application Laid-open No. H11-130714 A, Japanese Patent Application Laid-open No. H10-195009 A, Japanese Patent Application Laid-open No. H10-195008 A, Japanese Patent Application Laid-open Nos. H10-182527 A to H10-182535 A, Japanese Patent Application Laid-open Nos. H09-309850 A to H09-309852 A, Japanese Patent Application Laid-open No. H09-286754 A, Japanese Patent Application Laid-open No. H09-173863 A, Japanese Patent Application Laid-open No. H09-173848 A, Japanese Patent Application Laid-open No. H09-173845 A. Dimethyl ether may be readily obtained in accordance with the technologies disclosed therein.

The separator may be equipped with a degasifier that has a heating unit for increasing the recovery ratio of the material that is gaseous at a normal temperature and a normal pressure for facilitating separation of effluent water from the material. The separator may further be equipped with an expander that recovers evaporative latent heat of the material that is gaseous at a normal temperature and a normal pressure.

The external heat sources mean heat sources located outside of the system. In the present invention, the external heat sources are two or more heat sources selected from the group that consists of atmosphere, sewage, warm effluent water, and ground water. Atmosphere means air that surrounds the system. Sewage means wastewater from which sludge is already separated or from which sludge is not separated yet. Warm effluent water means warm water discharged from an incineration facility, an electric power plant, and the like. The temperature thereof depends on incineration exhaust heat and the like. Ground water means water that is present in the ground. The temperature thereof depends on the heat in the ground. The temperature range of the external heat from the external heat sources may vary depending on seasons and geographic conditions of the system. Typically, the temperature of the atmosphere is −10° C. to 40° C., the temperature of the sewage is 15° C. to 25° C., the temperature of the warm effluent water is 40° C. to 80° C., and the temperature of the ground water is 10° C. to 20° C. It is preferable that the external heat sources include either one or more of the atmosphere and the sewage. In particular, it is preferable that the external heat sources are a combination of the atmosphere and the sewage.

The external heat sources are supplied to the evaporator or to the condenser, as will be described below. As an external heat supply unit, an ambient air supply fan may be used when the atmosphere is the external heat source, whereas a passage is used when the sewage, the warm effluent water or the ground water is the external heat source.

The external heat supply destination controlling unit identifies an external heat source A and an external heat source B that radiates a lower external heat than that from the external heat source A on the basis a temperature of an external heat detected by the external heat temperature detector, and then controls the external heat from the external heat source A to be supplied to the evaporator and the external heat from the external heat source B to be supplied to the condenser. That is, for example, if the external heat sources are the atmosphere and the sewage, and the temperature of the atmosphere is 30° C. and the temperature of the sewage is 15° C. both of which are detected by the external heat temperature detector, then the atmosphere is controlled so as to be supplied to the evaporator and the sewage is controlled so as to be supplied to the condenser. It is preferable that the external heat supply destination controlling unit discontinues supply of the external heats to any one of the evaporator and the condenser or both if there is no difference between temperatures of the external heats detected by the external heat temperature detector. An example of the external heat supply destination controlling unit may be a unit that controls a switching valve provided upstream of each external heat source in the circuit.

[Descriptions of the First Embodiment with Reference to Block Diagrams (FIGS. 1 and 2)]

Figure 2:
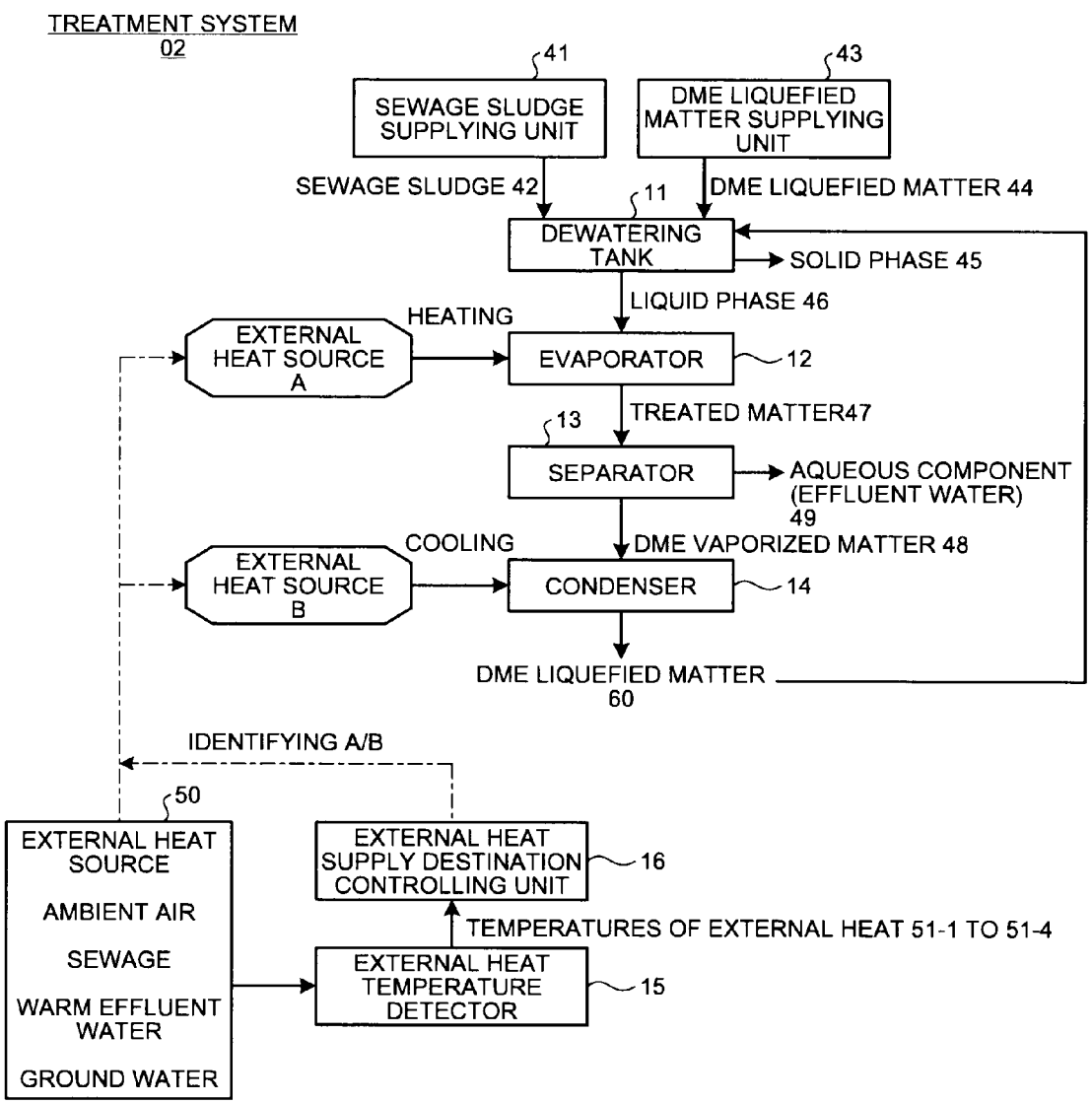
FIG. 2 is a block diagram for conceptually explaining a treatment system 02 that is an example of the treatment system according to the present invention.

A basic overview of the treatment system of the present invention will be described with reference to FIGS. 1 and 2. FIG. 1 is a block diagram for conceptually explaining a treatment system 01 that is an example of the treatment system according to the present invention, and FIG. 2 is a block diagram for conceptually explaining a treatment system 02 that is another example of a treatment system according to the present invention. In the following, FIG. 1 will firstly be explained, and subsequently FIG. 2 will be explained as to only the difference from FIG. 1.

The treatment system 01 shown in FIG. 1 comprises a dewatering tank 11, an evaporator 12, a separator 13, a condenser 14, an external heat temperature detector 15, and an external heat supply destination controlling unit 16. The treatment system 01 further comprises a sewage sludge supplying unit 41 that supplies sewage sludge 42 to the dewatering tank 11 and a DME liquefied matter supplying unit 43 that supplies DME liquefied matter 44 to the dewatering tank 11.

In the treatment system 01 shown in FIG. 1, the sewage sludge 42 is supplied from the sewage sludge supplying unit 41 to the dewatering tank 11, and the DME liquefied matter 44 is supplied from the DME liquefied matter supplying unit 43 to the dewatering tank 11. In the dewatering tank 11, a solid phase 45 of the sewage sludge (i.e., a part of the sludge in a state of solid or gel) is separated and removed, and a liquid phase 46 that is the remaining part is supplied to the evaporator 12. In the evaporator 12, the DME is vaporized. The temperature when the DME is vaporized may be set to be higher than a temperature in the dewatering tank 11, and the pressure when the DME is vaporized may be set to be lower than the pressure in the dewatering tank 11. The temperature condition and the pressure condition are as those that have already described. Treated matter 47 from the evaporator 12 is sent to the separator 13 where the treated matter 47 is separated into DME vaporized matter 48 and an aqueous component (effluent water) 49. The DME vaporized matter 48 is supplied to the condenser 14, and is condensed to be DME liquefied matter 60.

For the treatment system 01, atmosphere, sewage, warm effluent water, and ground water are available as external heat sources 50. Temperatures 51-1 to 51-4 of atmosphere, sewage, warm effluent water, and ground water are each detected by the external heat temperature detector 15. The external heat supply destination controlling unit 16 decides which external heat sources are to be designated as the external heat source A or B, depending on the temperatures 51-1 to 51-4 detected by the external heat temperature detector 15. For example, if the warm effluent water temperature 51-3 is lower than the atmospheric temperature 51-1, it is decided that the atmosphere is selected as the external heat source A and the warm effluent water is selected as the external heat source B. The external heat supply destination controlling unit 16 controls the external heat sources A and B so that an external heat from the external heat source A (that is the atmosphere in the example described above) is supplied to the evaporator 12 and that an external heat from the external heat source B (that is the warm effluent water in the example described above) is supplied to the condenser 14.

The external heat supply destination controlling unit 16 may discontinue supply of the external heats to the evaporator 12 or to the condenser 14 after determining the temperature difference if there is a small or no difference between the external heat sources A and B. If the external heat supply destination controlling unit 16 detects that there is no temperature difference between the external heat sources, designation of the external heat sources A or B cannot be performed. Therefore the external heats cannot be supplied.

Subsequently, the treatment system 02 shown in FIG. 2 will be described. In the treatment system 02, the DME liquefied matter 60 that is obtained from the condenser 14 is again supplied to the dewatering tank 11. If the DME liquefied matter 60 provides sufficient DME supply to the dewatering tank 11, supply of the DME liquefied matter 44 from the DME liquefied matter supplying unit 43 may be discontinued. DME can be recycled in the treatment system 02 for conserving resources.

[Example of the First Embodiment of the Present Invention (FIG. 3)]

Figure 3:
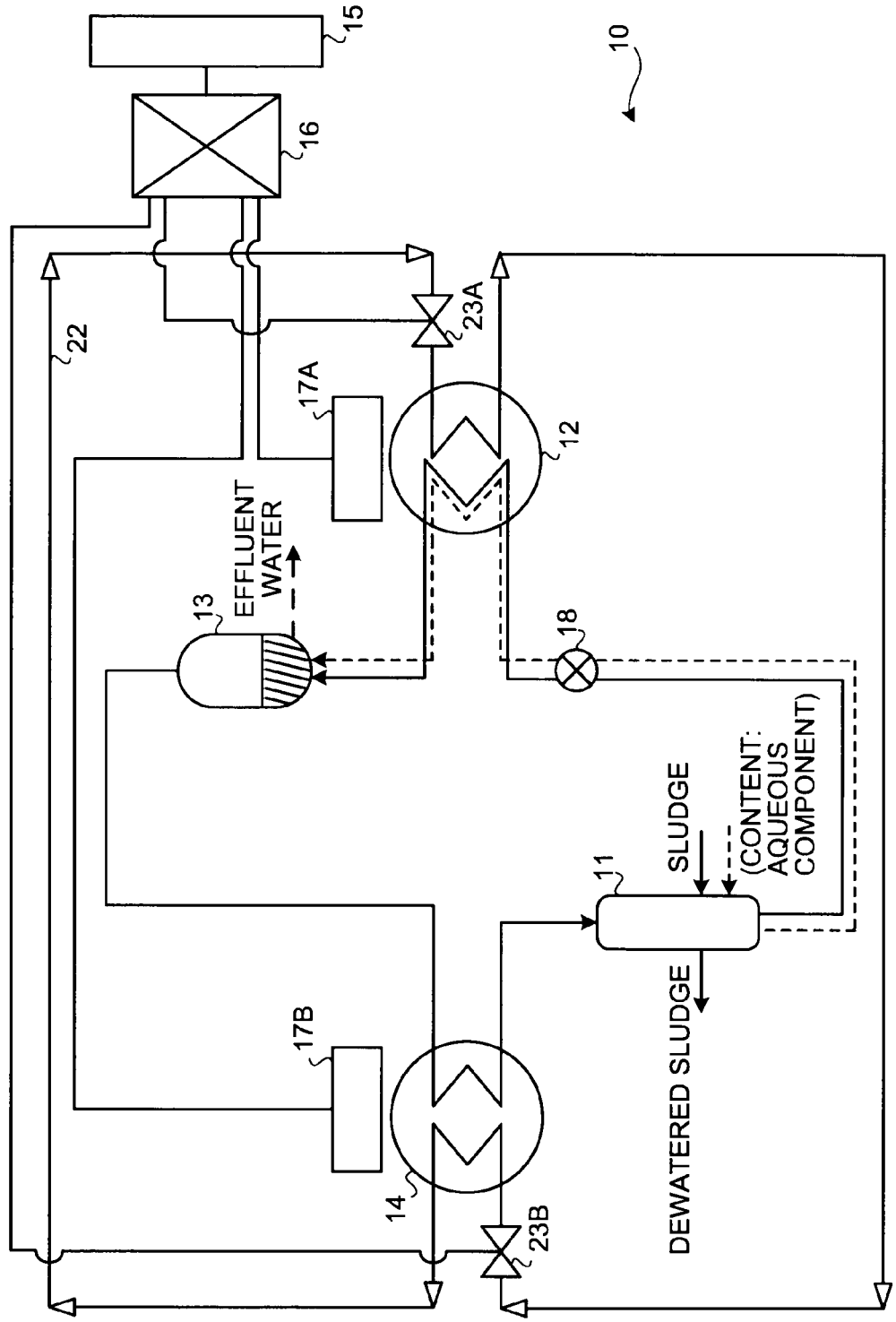
FIG. 3 is a schematical view of a configuration example of the treatment system according to the present invention.

An example of the treatment system according to the first embodiment is shown in FIG. 3. In a treatment facility 10 shown in FIG. 3, the dewatering tank 11, the evaporator 12, the separator 13 and the condenser 14 form a circuit. In addition to the circuit, the external heat temperature detector 15, the external heat supply destination controlling unit 16, the ambient air supply fans 17A and 17B are connected in series. A decompression valve 18 that adjusts a pressure when liquefy dimethyl ether is vaporized is provided between the dewatering tank 11 and the evaporator 12. The external heat supply destination controlling unit 16 connects a first switching valve 23A and a second switching valve 23B that are located in a sewage passage 22. A DME tank (not shown) is connected to the dewatering tank 11, and thus, DME is filled into the system.

In the treatment system according to the first embodiment, the temperature of either the evaporator 12 or the condenser 14 is adjusted by the external heat sources.

In the treatment system according to the first embodiment, the route of the material that is gaseous at a normal temperature and a normal pressure is as follows.

The material that is gaseous at a normal temperature and a normal pressure is supplied to the dewatering tank 11 as liquefied matter, and then contacts sewage sludge. The aqueous component that has been dissolved in the sludge is dissolved in the material. The material is transferred to the evaporator 12. The material that is gaseous at a normal temperature and a normal pressure is separated from the aqueous component in the evaporator 12, and is turned into an overheated gas again. The gas and the aqueous component that have come out of the evaporator 12 are separated into a gas and effluent water in the separator 13. Then, the effluent water is discarded, whereas the gas is transferred to the condenser 14 and cooled therein to be supercooled fluid (liquefied matter of the material that is gaseous at a normal temperature and a normal pressure). The supercooled fluid is supplied to the dewatering tank 11, and therein contacts sewage sludge again.

The sewage sludge is supplied to the dewatering tank 11, and the sewage sludge is dissolved in the material that is gaseous at a normal temperature and a normal pressure (in a liquid state). The flow of the component (mainly aqueous component) dissolved in the material in the sewage sludge is shown in the dotted line in FIG. 3. The component reaches the evaporator 12 in a state that the component is dissolved in the matter (in a liquid state). In the evaporator 12, most of liquid part of the material that is gaseous at a normal temperature and a normal pressure is vaporized, and the aqueous component dissolved therein is separated therefrom and reaches the separator 13. In the separator 13, the material is separated into steam of the material and the aqueous component. The aqueous component is then removed as effluent water.

The route for supplying the external heats is as follows. The external heat temperature detector 15 detects that the temperature of the ambient air is 30° C. and the temperature of the sewage is 15° C. The external heat supply destination controlling unit 16 identifies the ambient air as the external heat source A, and actuates the ambient air supply fan 17A located close to the evaporator 12, to supply the ambient air to the evaporator 12. At the same time, the external heat supply destination controlling unit 16 identifies the sewage as the external heat source B, and switches the first switching valve 23A located in the sewage passage 22 to allow the current to the condenser, for thereby starting supply of the sewage.

Then, the external heat temperature detector 15 detects that the temperature of the ambient air is 0° C. and the temperature of the sewage is 20° C. The external heat supply destination controlling unit 16 identifies the sewage as the external heat source A. Then, the external heat supply destination controlling unit 16 opens the first switching valve 23A located in the sewage passage 22 and starts supply of the sewage to the evaporator. On the other hand, the external heat supply destination controlling unit 16 identifies the ambient air as the external heat source B. Then, the external heat supply destination controlling unit 16 actuates the ambient air supply fan 17B located close to the condenser 14, and supplies the ambient air to the condenser 14.

Then, the external heat temperature detector 15 detects that the temperatures of the ambient air and the sewage are both 20° C. Then, the external heat supply destination controlling unit 16 does not identify the external heat sources A nor B, and thus stops the ambient air supply fan 17A. Simultaneously, the external heat supply destination controlling unit 16 switches the second switching valve 23B located in the sewage passage to allow the current to the condenser.

In this manner, treatment of sludge in a facility device shown in FIG. 3 as described above enables control depending on the temperature difference between the ambient air and the sewage that are the external heat sources. That is, if a temperature of the ambient air is higher than a temperature of the sewage, the temperature of the evaporator can be adjusted by using the ambient air and the temperature of the condenser can be adjusted by using the sewage. On the other hand, if the temperature of the sewage is higher than the temperature of the ambient air, the temperature of the evaporator can be adjusted by using the sewage, and the temperature of the condenser can be adjusted by using ambient air.

In the treatment system according to the first embodiment, there is no particular limitation on the temperature adjustment means when there is no temperature difference between the external heat sources.

[Overview of a Second Embodiment of the Present Invention]

The treatment system according to the present invention may further comprise a compressor that compresses a gas of the material that is gaseous at a normal temperature and a normal pressure and a compressor controlling unit that controls the compressor, in addition to the aforementioned units of the first embodiment.

The compressor may be of any type as long as it is capable of compressing the vapor of the material that is gaseous at a normal temperature and a normal pressure. The compressor may be an electric compressor or a compressor that recovers and utilizes evaporative latent heat of the material that is gaseous at a normal temperature and a normal pressure that has been separated from a circuit.

The compressor controlling unit actuates the compressor if the temperature difference between external heats radiated from the external heat sources A and B detected by the external heat supply destination controlling unit is small, e.g. 15° C. or less, or if there is no temperature difference between external heats detected by the external heat temperature detector. An example of the compressor controlling unit may be a controlling unit for a switching valve provided upstream of the compressor in the circuit.

The treatment system according to the present invention preferably comprises a unit or two or more units selected from the group that consists the external heat source A identified by the external heat supply destination controlling unit, the evaporator, and the separator; a unit or two or more units selected from the group that consists of the external heat source B identified by the external heat supply destination controlling unit, the condenser, and the cooler; and a heat exchanger that exchanges heat therebetween. By providing the heat exchanger that exchanges heat between a high temperature machine and a low temperature machine in this manner, an energy efficiency of the system can be improved.

It is further preferable that the heat exchanger is the one which exchanges heat between a unit or two or more units selected from the group that consists of the evaporator and the separator and a unit or two or more units selected from the group that consists of the condenser and the cooler, wherein the heat exchanger is equipped with, as another machinery, a heat exchanger controlling unit that actuates the heat exchanger if there is little difference between the temperatures of the external heats radiated from the external heat sources A and B identified by the external heat supply destination controlling unit, specifically less than 15° C., or if there is no difference between temperatures detected by the external heat temperature detector.

With these features, the heat exchanger can vaporize the material that is gaseous at a normal temperature and a normal pressure, utilizing the temperature difference within the system even if there is small or no difference between the temperatures of the external heat sources.

The treatment system according to the present invention may further comprise a cooler that cools the material that is gaseous at a normal temperature and a normal pressure, and a cooler controlling unit that actuates the cooler if the temperature difference between the external heats radiated from the external heat sources A and B detected by the external heat supply destination controlling unit is less than 15° C., or if there is no temperature difference between the external heats detected by the external heat temperature detector.

The cooler is to adjust the temperature of the gas discharged from the dewatering tank to the optimal inlet temperature for the evaporator and the heat exchanger. A typical cooler for this purpose utilizes circulation of coolant water.

[Descriptions of the Second Embodiment with Reference to a Block Diagram (FIG. 4)]

Figure 4:
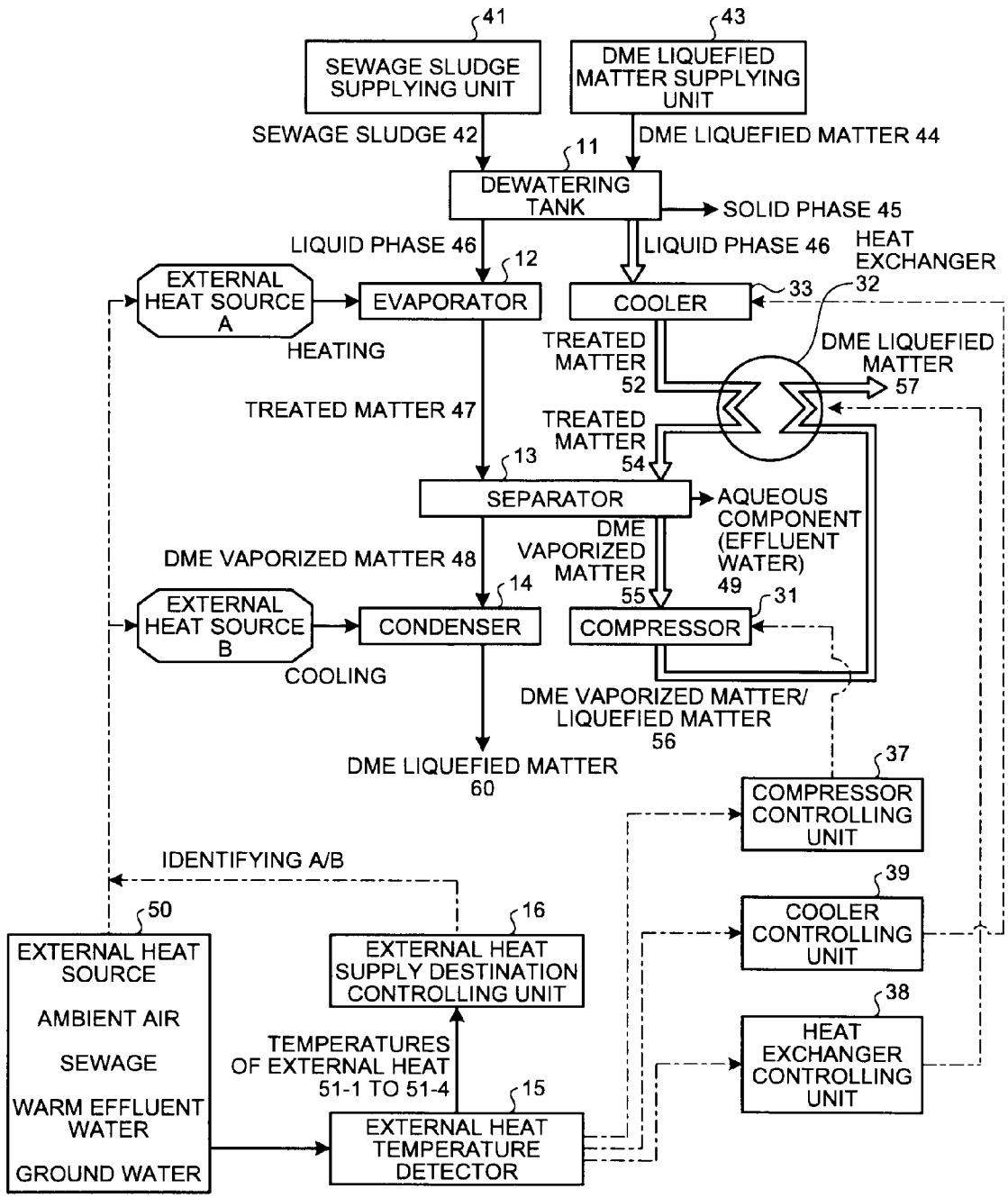
FIG. 4 is a block diagram of a treatment system 03 that is an example of the treatment system according to the present invention.

An overview of an embodiment of the treatment system according to the present invention wherein the system comprises a compressor, a compressor controlling unit, a heat exchanger, a heat exchanger controlling unit, a cooler, and a cooler controlling unit will be described with reference to FIG. 4. FIG. 4 is a block diagram for conceptually explaining a treatment system 03 that is an example of the treatment system according to the present invention. The explanation hereinbelow mainly refers to the difference between FIGS. 4 and 1.

In addition to the route including the dewatering tank 11, the evaporator 12, the separator 13 and the condenser 14 that is similar to the route which the treatment system 01 has, the treatment system 03 has another route including the dewatering tank 11, a cooler 33, a heat exchanger 32, the separator 13, a compressor 31, and the heat exchanger 32. The compressor 31, the heat exchanger 32, and the cooler 33 are controlled by the compressor controlling unit 37, a heat exchanger controlling unit 38, and a cooler controlling unit 39, respectively. The heat exchanger 32 is illustrated as an example of a heat exchanger that exchanges heat between the cooler 33 and the compressor 31.

If there is small or no temperature difference between the external heat sources A and B identified by the external heat supply destination controlling unit, the compressor controlling unit 37, the heat exchanger controlling unit 38, the cooler controlling unit 39 actuate the compressor 31, the heat exchanger 32, and the cooler 33, respectively. The actuation may be performed by, for example, controlling switching valves (not shown) located in the circuit. Then, the liquid phase 46 that has been discharged from the dewatering tank 11 is sent to the cooler 33. Treated matter 52 that has been discharged from the cooler 33 is sent to the heat exchanger 32. In the heat exchanger 32, evaporation treatment under a high temperature is performed. Treated matter 54 is sent to the separator 13, and converted into DME vaporized matter 55. The DME vaporized matter 55 is sent to the compressor 31, and is compressed therein. Thus, DME vaporized matter/liquefied matter 56 (that is, a mixture of vaporized matter and liquefied matter) is produced. The DME vaporized matter/liquefied matter 56 is sent to the heat exchanger 32. The DME vaporized matter/liquefied matter 56 is utilized for heating the liquid phase 46, and vaporized matter contained in the DME vaporized matter/liquefied matter 56 is compressed by cooling, to give DME liquefied matter 57 having a high purity. Similarly to the operation of the treatment system 02 (FIG. 2), the DME liquefied matter 57 thus obtained may be sent to the dewatering tank 11 again (not shown in FIG. 3) for recycling.

[An Example of the Second Embodiment of the Present Invention (FIG. 5)]

Figure 5:
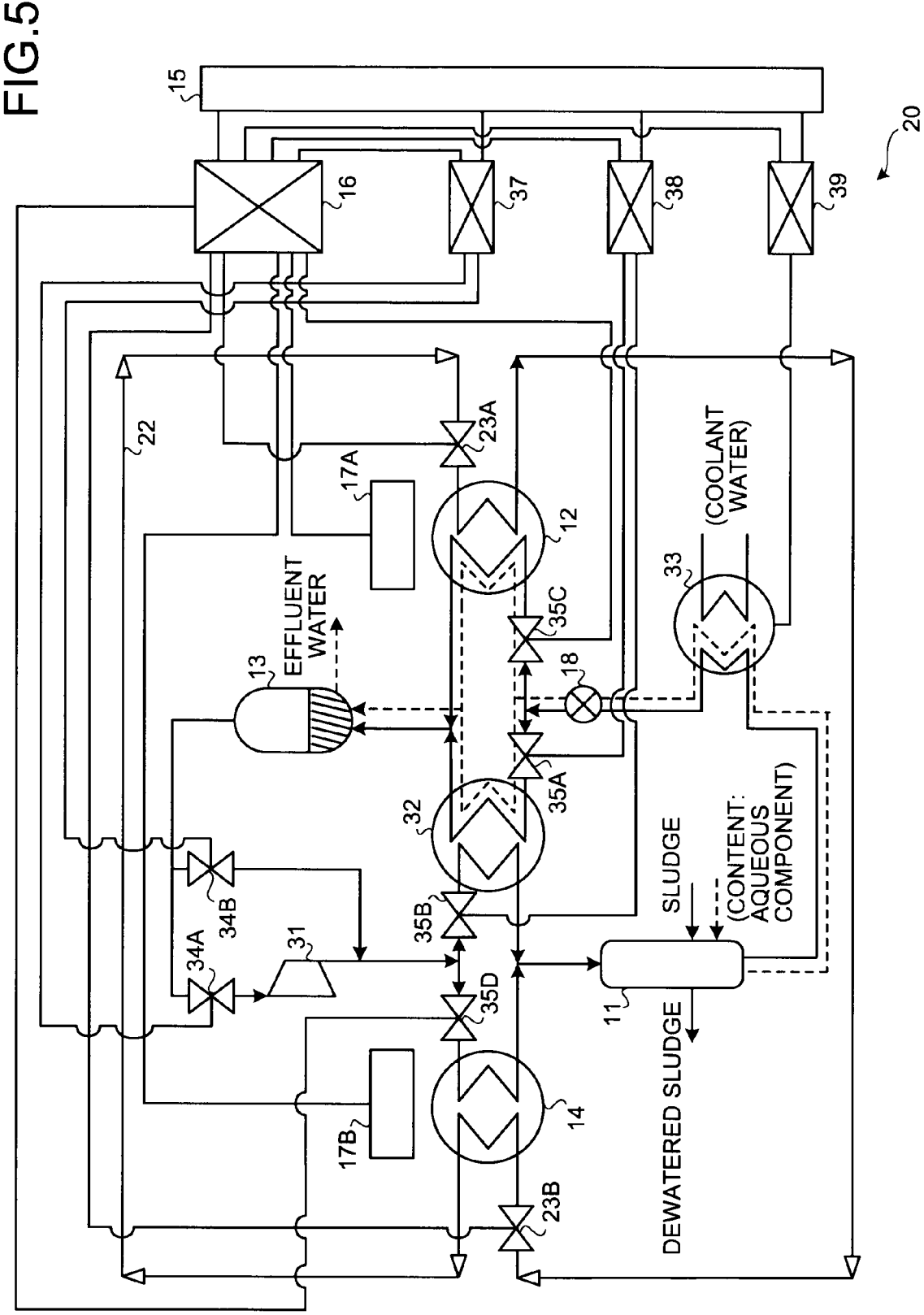
FIG. 5 is a schematical view of a configuration example of the treatment system according to the present invention.

A treatment system according to the second embodiment is shown in FIG. 5. A treatment facility 20 shown in FIG. 5 is identical to the treatment system according to the first embodiment in that the dewatering tank 11, the evaporator 12, the separator 13 and the condenser 14 form a circuit, that the external heat temperature detector 15, the external heat supply destination controlling unit 16 and the ambient air supply fans 17A and 17B are connected and the ambient air supply fans 17A and 17B are connected to the evaporator 12 and the condenser 14, respectively, and that the external heat supply destination controlling unit 16 connects the first switching valve 23A and the second switching valve 23B that are located in the sewage passage 22. Therefore, the identical components are denoted by the same reference numerals and the detailed description thereof is omitted. Although not shown, a DME tank is connected to the dewatering tank 11, whereby DME is supplied to the system.

The treatment system according to the second embodiment further comprises the compressor 31, the heat exchanger 32, and the cooler 33. The compressor 31 is located between the separator 13 and the condenser 14. The compressor 31 disconnectably connects the separator 13 and the condenser 14 via switching valves 34A and 34B. The heat exchanger 32 is located between the condenser 14 and the evaporator 12. The heat exchanger 32 and the condenser 14 are disconnectably connected via switching valves 35B and 35D. The heat exchanger 32 and the evaporator 12 are disconnectably connected vie switching valves 35A and 35C. The cooler 33 is located between the dewatering tank 11 and the evaporator 12. The external heat temperature detector 15 and the external heat supply destination controlling unit 16 further connect the compressor controlling unit 37, the heat exchanger controlling unit 38, and the cooler controlling unit 39. The compressor controlling unit 37 is connected to the switching valves 34A and 34B (not shown). The heat exchanger controlling unit 38 is connected to the switching valves 35A to 35D (not shown). The cooler controlling unit 39 is directly connected to the cooler 33.

In the treatment system according to the second embodiment, the route of the material that is gaseous at a normal temperature and a normal pressure is as follows.

The route of the material that is gaseous at a normal temperature and a normal pressure is identical to the route of the treatment system according to the first embodiment if the temperature difference between the ambient air and the sewage that are external heat sources is 15° C. or more. That is, the material that is gaseous at a normal temperature and a normal pressure is supplied to the dewatering tank 11 as liquefied matter, and contacts sewage sludge. The aqueous component that has been in the sludge is dissolved in the material. The material passes through the switching valve 35C and transferred to the evaporator 12. In the evaporator 12, the material that is gaseous at a normal temperature and a normal pressure is separated from the aqueous component, and is turned into an overheated gas again. The gas and the aqueous component that have come out of the evaporator 12 are separated into the gas and effluent water in the separator 13. Then, the effluent water is discarded, whereas the gas passes through the switching valve 35D and is transferred to the condenser 14, and is cooled therein to be supercooled fluid. The supercooled fluid is supplied to the dewatering tank 11, and therein contacts sewage sludge again.

Meanwhile, if there is no temperature difference between the ambient air and the sewage (that is, if the ambient temperature and the sewage temperature are the same), the operation is as follows. The material that is gaseous at a normal temperature and a normal pressure is supplied to the dewatering tank 11 as liquefied matter, and then contacts sewage sludge. The aqueous component that has been dissolved in the sludge is dissolved in the material. The material is then cooled and depressurized by the cooler, and then passes through the switching valve 35A to be transferred to the heat exchanger 32 in which the material that is gaseous at a normal temperature and a normal pressure is separated from the aqueous component and is turned into an overheated gas again. The gas and the aqueous component that have come out of the heat exchanger 32 are separated into the gas and the aqueous component in the separator 13. The aqueous component passes through the switching valve 34A and is transferred to the compressor 31. Then, the aqueous component further passes through the switching valve 35B and is transferred to the heat exchanger 32, in which the aqueous component is turned into supercooled fluid (liquefied matter) by cooling. The supercooled fluid is supplied to the dewatering tank 11, and contacts sewage sludge again.

If the temperature difference between the ambient air and the sewage is less than 15° C. (that is, if the temperature difference is more than 0° C. and less than 15° C.), the operation is as follows. The material that is gaseous at a normal temperature and a normal pressure is supplied to the dewatering tank 11 as liquefied matter, and contacts sewage sludge. The aqueous component that has been dissolved in the sludge is dissolved in the material. The material is then cooled and depressurized by the cooler. The material then passes through the switching valve 35A to be transferred to the heat exchanger 32, and also passes through the switching valve 35C to be transferred to the evaporator 12. In the heat exchanger 32 and the evaporator 12, the material that is gaseous at a normal temperature and a normal pressure is separated from the aqueous component, and is turned into an overheated gas again. The gas and the aqueous component that have come out of the heat exchanger 32 and the evaporator 12 are separated into the gas and effluent water at the separator 13. The effluent water is discarded, whereas the gas passes through the switching valve 34A and is transferred to the compressor 31. The gas further passes through the switching valve 35B and is transferred to the heat exchanger 32, in which the gas is turned into supercooled fluid (that is, liquefied matter) by cooling. Simultaneously, the gas passes through the switching valve 35D and is transferred to the condenser 14, in which the gas is turned into supercooled fluid (that is, liquefied matter). The supercooled fluid is supplied to the dewatering tank 11, and contacts sewage sludge again.

The following is an explanation on a relationship between the temperature difference between the ambient air and the sewage and the operation route of the evaporator 12, the condenser 14, the compressor 31, the heat exchanger 32, and the cooler 33 in the system of the second embodiment.

As a first example, if the temperature difference between the ambient air and the sewage is 15° C. or more, the operation is as follows. The external heat temperature detector 15 detects that the temperature of the ambient air is 30° C. and the temperature of the sewage is 15° C. The external heat supply destination controlling unit 16 identifies the ambient air as the external heat source A and identifies the sewage as the external heat source B, and transmits signals on the basis of the information to the compressor controlling unit 37, the heat exchanger controlling unit 38, and the cooler controlling unit 39.

Then, the external heat supply destination controlling unit 16 performs control by which the switching valves 23B, 35C, and 35D are opened, the switching valve 23A is closed, and the fan 17A is actuated.

The compressor controlling unit 37 detects that the temperature difference between the ambient air (that is, the external heat source A) and the sewage (that is, the external heat source B) is 15° C. or more, and closes the switching valve 34A to close the route to the compressor 31. The heat exchanger controlling unit 38 also detects that the temperature difference between the ambient air and the sewage is 15° C. or more, and closes the switching valves 35A and 35B to close the route to the heat exchanger. The cooler controlling unit 39 also detects that the temperature difference between the ambient air and the sewage is less than 15° C., and stops the cooler 33.

On the other hand, if the temperature of the sewage is higher than the temperature of the ambient air by 15° C. or more in the first example, the operation is as follows. For example, the external heat temperature detector 15 detects that the temperature of the ambient air is 0° C. and the temperature of the sewage is 20° C. However, the external heat supply destination controlling unit 16 does not identify the external heat sources A and B, and the unit 16 transmits signals on the basis of the information to the compressor controlling unit 37, the heat exchanger controlling unit 38 and the cooler controlling unit 39.

The external heat supply destination controlling unit 16 performs control by which the switching valves 23A, 35C, and 35D are opened, the switching valve 23B is closed, and the fan 17A is actuated.

Other operations for the compressor controlling unit 37, the heat exchanger controlling unit 38, and the cooler controlling unit 39 are identical to the example described above.

The sewage is identified as the external heat source A, and the second swathing valve 23B located in the sewage passage 22 is opened for starting supply of sewage to the evaporator 12. On the other hand, the external heat supply destination controlling unit 16 identifies the ambient air as the external heat source B, and actuates the ambient air supply fan 17B that is located close to the condenser 14, for sending the ambient air to the condenser 14.

As a second example, if the temperature difference between the ambient air and the sewage is less than 15° C., the operation is as follows. The external heat temperature detector 15 detects that the temperature of the ambient air is 25° C. and the temperature of the sewage is 15° C. The external heat supply destination controlling unit 16 identifies the ambient air as the external heat source A and the sewage as the external heat source B, and transmits signals on the basis of the information to the compressor controlling unit 37, the heat exchanger controlling unit 38, and the cooler controlling unit 39.

Similar to the first example, the external heat supply destination controlling unit 16 performs control by which the switching valves 23B, 35C, and 35D are opened, the switching valve 23A is closed, and the fan 17A is actuated.

The compressor controlling unit 37 detects that the temperature difference between the ambient air (that is, the external heat source A) and the temperature of the sewage (that is, the external heat source B) is less than 15° C., and opens the switching valve 34A to open the route to the compressor 31. The heat exchanger controlling unit 38 also detects that the temperature difference between the ambient air and the sewage is less than 15° C., and opens the switching valves 35A and 35B to open the route to the heat exchanger 32. The cooler controlling unit 39 also detects that the temperature difference between the ambient air and the sewage is less than 15° C., and actuates the cooler 33.

In the second example, if there is no temperature difference between the ambient air and the sewage (that is, the difference is 0° C.), the operation is as follows. The external heat temperature detector 15 detects that temperatures of the ambient air and the sewage are 20° C. The external heat supply destination controlling unit 16 does not identify the external heat sources A and B, and transmits signals on the basis of the information to the compressor controlling unit 37, the heat exchanger controlling unit 38, and the cooler controlling unit 39.

The external heat supply destination controlling unit 16 performs control by which the switching valves 23B, 35C, and 35D are closed and the fan 17A is stopped.

The compressor controlling unit 37 detects that there is no temperature difference between the ambient air (that is, the external heat source A) and the sewage (that is, the external heat source B) and opens the route to the compressor 31 by opening the switching valve 34A. The heat exchanger controlling unit 38 also detects that there is no temperature difference between the ambient air and the sewage, and opens the route to the heat exchanger 32 by closing the switching valves 35A and 35B. The cooler controlling unit 39 also detects that there is no temperature difference between the ambient air and the sewage, and actuates the cooler 33.

Accordingly, when sludge is treated in the facility device shown in FIG. 5, the facility device can be controlled depending on the temperature difference between the ambient air and the sewage that are the external heat sources. That is, if the temperature difference between the ambient air and the sewage is 15° C. or more, the ambient air may be utilized for adjusting the temperature of the evaporator, whereas the sewage may be utilized for adjusting the temperature of the condenser. If the temperature difference between the ambient air and the sewage is less than 15° C. and there is a temperature difference (that is, a temperature difference is more than 0° C.), the ambient air and the compressor may be utilized for adjusting the temperature of the evaporator, the sewage may be utilized for adjusting the temperature of the condenser, and the heat exchanger and the cooler are additionally used for adjusting the temperature of the system. If there is no temperature difference between the ambient air and the sewage, the system can be operated using the compressor, the cooler, and the heat exchanger without using the ambient air or the sewage.

When the sludge is treated in the facility device shown in FIG. 5, if there is a temperature difference between the ambient air and the sewage, actuation of the compressor, the heat exchanger, and the cooler is not required since the ambient air and the sewage can be utilized. Therefore, energy therefor can be saved.

For example, it is assumed that dimethyl ether is used as a liquid of the material that is gaseous at a normal temperature and a normal pressure, for application to the sludge. If the temperature difference between the ambient air and the sewage is less than 15° C., the compressor has to maintain the temperature and the pressure at the inlet at 0.51 MPa and 25° C., respectively, and the pressure and the temperature at the outlet at 0.78 MPa and 39° C., respectively. Under these conditions, if the temperature difference between the ambient air and the sewage is 15° C. or more, the aforementioned adjustment of the pressure and the temperature by the compressor is not necessary. Therefore, energy therefor can be saved.

The invention claimed is:

1. A treatment system for a watery material, the treatment system comprising:
   a dewatering tank in which liquefied matter of a material that is gaseous at a normal temperature and a normal pressure is contacted with the watery material, and the watery material is separated into a resultant watery material and a liquid phase that contains an aqueous component derived from the watery material and the liquefied matter of material that is gaseous at a normal temperature and a normal pressure;
   an evaporator that vaporizes the liquefied matter of material that is gaseous at a normal temperature and a normal pressure from the liquid phase;
   a separator that separates from the liquid phase a gas of the material thus vaporized from effluent water and that discards the effluent water;
   a condenser that condenses the gas into the liquefied matter that is gaseous at a normal temperature and a normal pressure;
   two or more external heat sources selected from the group consisting of atmosphere, sewage, warm effluent water, and ground water;
   an external heat temperature detector that detects temperatures of external heats of the external heat sources; and
   an external heat supply destination controlling unit that identifies an external heat source A and an external heat source B that radiates an external heat lower than an external heat from the external heat source A on the basis of the temperatures of the external heats detected by the external heat temperature detector, and controls the external heat from the external heat source A to be supplied to the evaporator and the external heat from the external heat source B to be supplied to the condenser.

2. The treatment system according to claim 1, wherein the external heat supply destination controlling unit discontinues supply of the external heats to any one of the evaporator and the condenser or both when there is no temperature difference between the external heats detected by the external heat temperature detector.

3. The treatment system according to claim 1, further comprising:
   a compressor that compresses the gas of the material that is gaseous at a normal temperature and a normal pressure; and
   a compressor controlling unit that actuates the compressor when a difference between temperatures of the external heats radiated from the external heat sources A and B that are identified by the external heat supply destination controlling unit is less than a predetermined value or when there is no temperature difference between the external heats detected by the external heat temperature detector.

4. The treatment system according to claim 3, wherein the compressor controlling unit actuates the compressor when a temperature difference between the external heats radiated from the external heat sources A and B that are identified by the external heat supply destination controlling unit is less than 15° C. or when there is no temperature difference between the external heats detected by the external heat temperature detector.

5. The treatment system according to claim 1, further comprising:

a cooler that cools a liquid of the material that is gaseous at a normal temperature and a normal pressure; and a cooler controlling unit that actuates the cooler when a temperature difference between the external heats radiated from the external heat sources A and B that are identified by the external heat supply destination controlling unit is less than a predetermined value or when there is no temperature difference between the external heats detected by the external heat temperature detector.

6. The treatment system according to claim 5, wherein the cooler controlling unit actuates the cooler when a temperature difference between the external heats radiated from the external heat sources A and B that are identified by the external heat supply destination controlling unit is less than 15° C. or when there is no temperature difference between the external heats detected by the external heat temperature detector.

7. The treatment system according to claim 5, further comprising a heat exchanger that exchanges heat between:

a unit or two or more units selected from the group consisting of the external heat source A identified by the external heat supply destination controlling unit, the evaporator, and the separator, and a unit or two or more units selected from the group consisting of the external heat source B identified by the external heat supply destination controlling unit, the condenser, and the cooler.

8. The treatment system according to claim 7, wherein the heat exchanger performs heat exchange between:

a unit or two or more unit selected from the group consisting of the evaporator and the separator, and a unit or two or more units selected from the group consisting of the condenser and the cooler, the treatment system further comprising a heat exchanger controlling unit that actuates the heat exchanger when a temperature difference between the external heat sources A and B that are identified by the external heat supply destination controlling unit is less than a predetermined value or when there is no temperature difference between the external heats detected by the external heat temperature detector.

9. The treatment system according to claim 8, wherein the heat exchanger controlling unit actuates the heat exchanger when a temperature difference between the external heats radiated from the external heat sources A and B that are identified by the external heat supply destination controlling unit is less than 15° C. or when there is no temperature difference between the external heats detected by the external heat temperature detector.

10. The treatment system according to claim 1, wherein the dewatering tank, the evaporator, the separator, and the condenser are connected in a series connection of a circuit so that the material that is gaseous at a normal temperature and a normal pressure circulates in the circuit.

11. The treatment system according to claim 1, wherein the material that is gaseous at a normal temperature and a normal pressure is one or a mixture of two or more selected from the group consisting of dimethyl ether, ethyl methyl ether, formaldehyde, ketene, acetaldehyde, butane, and propane.

* * * * *